UNITED STATES PATENT OFFICE.

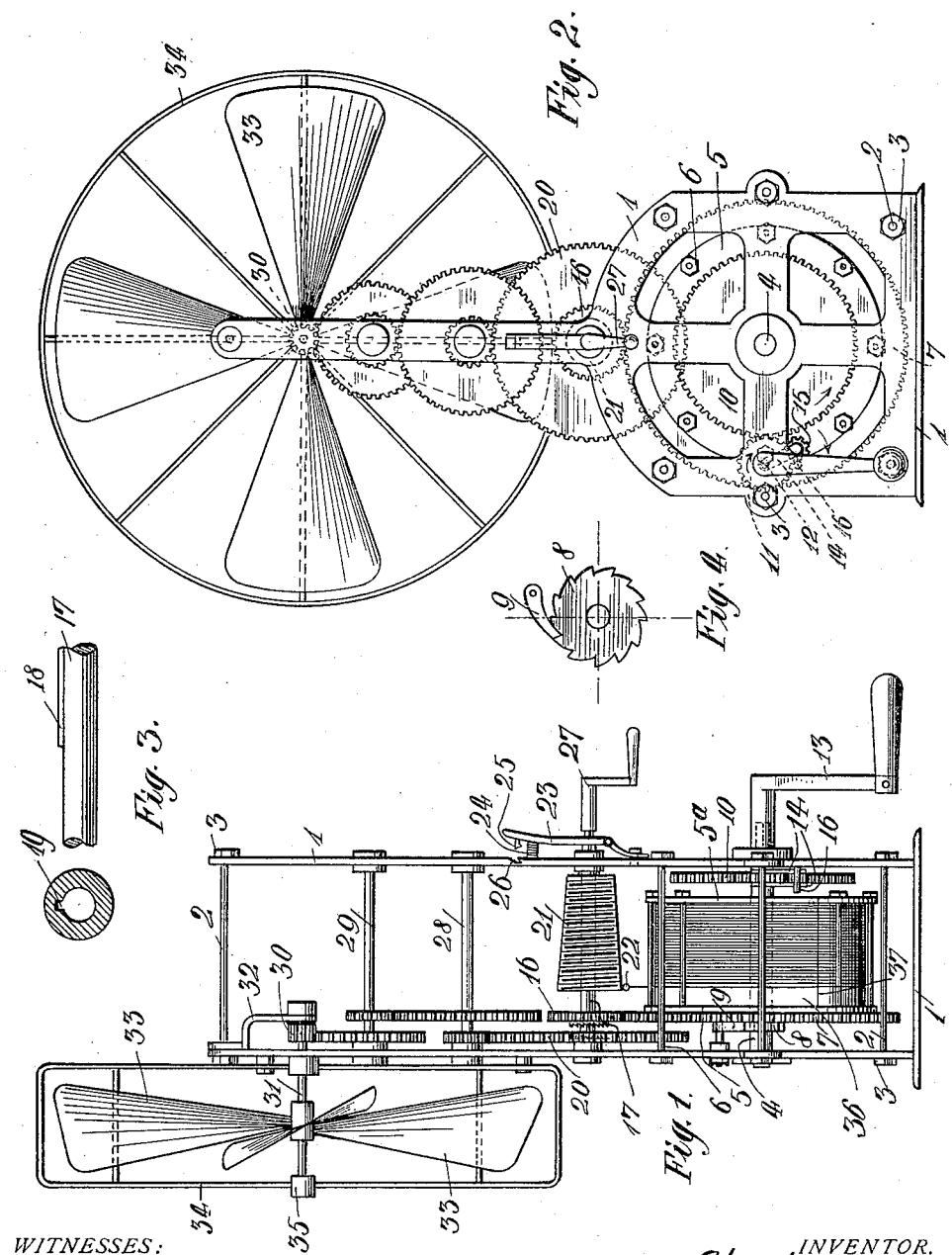

CHARLES SCHATTE, OF NEW YORK, N. Y.

SPRING-MOTOR.

1,130,637.  Specification of Letters Patent.  Patented Mar. 2, 1915.

Application filed May 20, 1914. Serial No. 839,770.

*To all whom it may concern:*

Be it known that I, CHARLES SCHATTE, a subject of the Emperor of Germany, residing at New York, in the county of New York and State of New York, have invented new and useful Improvements in Spring-Motors, of which the following is a specification.

This invention relates to mechanical fans and has as its principal object to provide a device of this character positively working for a considerable space of time and giving the desired effect.

A further object of my invention is to provide means whereby in case of breakdown of some of the main working parts of the device, working order can be restored to it at once by any laic person.

In the accompanying drawing: Figure 1 is a side elevational view of the device constructed according to my invention and Fig. 2 is a front elevational view of the same, some hidden parts being shown in both views in dotted lines. Fig. 3 is a detail view, partly in section and partly in elevation. Fig. 4 is an elevational view of part of the mechanism of the device.

Throughout the separate views the same part is designated by the same reference character.

Referring more particularly to the drawing, the reference character 1 denotes a frame stiffened by bolts such as 2 passing through the front and rear parts of the frame 1 and fastened by nuts such as 3 on the outside of the same.

Journaled into the frame is a main shaft 4 and rigidly attached to same is one end of a powerful spring coiled up around the shaft 4, within a spring-casing composed of two circular plates 5—5ᵃ connected by bolts such as 6, rotatably mounted on the shaft 4. A toothed wheel 7 is integral with the plate 5 of the spring casing as is also a smaller toothed wheel 8, forming, in conjunction with a pawl 9 hingedly mounted to the frame 1, a ratchet locking the spring casing from rotation during the process of winding up the spring and allowing of its rotation during the expansion of the spring. The ratchet is shown in Fig. 4. Rigidly mounted on the shaft 4, at its rear end, is a toothed wheel 10 in engagement with a smaller toothed wheel 11, rigidly mounted on a shaft 12 journaled into the frame 1, the shaft 12 projecting out of the frame at the rear and being continued in a crank 13. The shaft 12 also carries, rotatably thereon, two lugs 14—14 on both sides of the toothed wheel 11, and between the lower ends of the lugs 14—14 is journaled a pin carrying rigidly thereon a cog wheel 15 kept in engagement with the wheel 11 by a pin 16 projecting out from the frame and preventing the lugs 14—14 to lapse into a perpendicular position. As will readily be seen, the clog wheel 15 is in plan with the toothed wheels 10 and 12 and rotates freely when these two wheels turn in the direction of the arrows, whereas in the contrary direction it clogs both wheels and locks them from rotation.

The toothed wheel 7 is normally in engagement with a smaller toothed wheel 16 rigidly mounted on a shaft 17 superposed to the shaft 4. On the shaft 17, in front of the wheel 16, is mounted a larger toothed wheel 20 in the hub of which there is a groove 19 and on the shaft 17, within the hub of the toothed wheel 16, there is a tongue 18 fitting into the groove 19, as shown in Fig. 3. The tongue 18 is just as long as the groove 19 in the hub of the wheel 20. The hubs of both the toothed wheels 16 and 20, at the sides facing each other, are formed into two parts of a ratchet or clutch catching and forming an engagement between the said two toothed wheels when they are pushed together, in one direction only, whereas in the other direction they work loose. Rigidly mounted on the shaft 17 is also a threaded cone pulley 21 having at its larger end an eyelet 22. The shaft 17 is prolonged outside the frame 1 and a neck formed therein which is engaged by a clamping member 23 hingedly mounted on the frame 1 and kept in the position shown in the drawing by a spring 24. A hook 25 near the upper end of the clamp 23, fitting into a recess 26 in the frame 1, serves for securing the clamp in a different position. A crank 27 is detachably mounted on the rear end of the shaft 17.

Shafts 28 and 29 with toothed wheels rigidly attached to them serve for transmitting the rotation from the toothed wheel 20 to a toothed wheel 30, rigidly mounted on a shaft 31 journaled into the frame 1 and into a hanger bearing 32 fastened to the frame 1; a propeller or fan 33 is rigidly mounted on the shaft 31 outside of the frame in front of same and a wire guard is suitably attached, around the propeller, to the frame 1. The shaft 31 ends in a bearing 35 carried by the guard 34.

The operation of the device is as follows: Normally the spring 37 is being wound up by means of the crank 13, when the ratchet shown in Fig. 4 locks the spring casing from rotation. When the spring is wound up, the spring casing with the toothed wheel 7 will rotate and actuate the propeller by means of the gear shown in the drawing and above described, accelerating the motion of the last member of the gear to such an extent as to drive the propeller with sufficient velocity to produce a fanning effect.

If any part of the main driving gear gets out of commission on account of a breakage of teeth or the like, I hook the end of the wire rope 36 into the eyelet 22 on the cone drum 21. Pushing the shaft 17 frontward by means of the clamp-lever 23, which will be hooked into the recess 26 worked in the casing 1, I get the gear 16 out of engagement with the main gear wheel 7. The gear wheel 16 will instead engage the gear wheel 20 by means of the ratchet formed in the hubs of the wheels 16 and 20, facing each other; the tongue 18 will then be out of engagement with the groove 19 in the hub of the wheel 20 so that while I wind up the wire rope 36 on the cone drum 21 by means of the crank handle 27, thereby putting the spring 37 under tension, the wheel 16 will pass by the wheel 20, whereas when this operation is performed and the crank handle released, the cone pulley 21 will be rotated by the action of the spring 37 on the wire rope 36 and the ratchet in the hubs of the wheels 16 and 20 will cause these two wheels to rotate with each other and with the shaft 17 rotated by the cone pulley 21, thus actuating the fan 33 by means of the intermediate gearing.

It is understood that while I have thus shown and described the preferred form of my invention, I do not want to be limited to its mechanical details and contemplate such changes and alterations in the construction of same which are mechanically equivalent thereto.

Having thus described my invention, what I claim is:

A spring motor comprising, in combination, a spiral spring within a spring casing integral with a main gear wheel, mounted on a main shaft, said main gear wheel normally in engagement with intermediate gearing the final link of which is rigidly mounted on a shaft carrying said fan; a conical drum adapted to engage one member of said intermediate gearing when said intermediate gearing is out of engagement with said main gear wheel; a wire rope with one end attached to and normally wound around said spring, adapted to have its free end attached to said conical drum and to put the said spring under tension by being coiled up around said conical drum; a crank handle each on said main shaft and on an auxiliary shaft carrying said conical drum; and a clamping lever adapted to push forward in its journals and lock in that position said auxiliary shaft, thereby disengaging the gear wheel mounted on said auxiliary shaft from said main gear wheel and forming a ratchet coupling between the said gear wheel mounted on the auxiliary shaft and another gear wheel mounted on the same shaft.

In testimony whereof, I have hereunto set my signature in the presence of two witnesses.

CHARLES SCHATTE.

Witnesses:
PAUL MÜLLER,
ALEXANDER DENES.

Copies of this patent may be obtained for five cents each, by addressing the "Commissioner of Patents, Washington, D. C."